United States Patent [19]
Findeisen et al.

[11] 3,857,897
[45] Dec. 31, 1974

[54] PROCESS FOR THE PRODUCTION OF ORTHOCARBONIC ACID ESTERS

[75] Inventors: Kurt Findeisen; Kuno Wagner, both of Leverkusen, Germany

[73] Assignee: Bayer Aktiengesellschaft, Leverkusen, Germany

[22] Filed: July 17, 1972

[21] Appl. No.: 272,224

[30] Foreign Application Priority Data
Aug. 3, 1971  Germany............................ 2138727

[52] U.S. Cl....... 260/613 R, 260/465 P, 260/609 F, 260/465 H, 260/473 F, 260/473 R, 260/607 A, 260/615 A
[51] Int. Cl............................................ C07c 41/00
[58] Field of Search ........ 260/615 A, 613 R, 465 P, 260/609 F, 465 H, 473 F, 473 R, 607 A

[56] References Cited
UNITED STATES PATENTS

| | | | |
|---|---|---|---|
| 2,527,494 | 10/1950 | Copenhaver.................... | 260/615 A |
| 2,567,927 | 9/1951 | Erickson......................... | 260/615 A |
| 2,611,787 | 9/1952 | Holm.............................. | 260/615 A |
| 3,306,939 | 2/1967 | Hill................................ | 260/615 A X |
| 3,354,100 | 11/1967 | Kuryla........................... | 260/615 A X |
| 3,388,147 | 6/1968 | Kamlet et al.................. | 260/615 A X |

*Primary Examiner*—Bernard Helfin
*Attorney, Agent, or Firm*—Burgess, Dinklage & Sprung

[57] ABSTRACT

Esters of orthocarbonic acid are prepared by reacting trichloromethyl isocyanide dichloride with a monofunctional aromatic hydroxy compound or with 2,2,2-trichloroethanol at a temperature in the range of from 0°C to 250°C.

6 Claims, No Drawings

PROCESS FOR THE PRODUCTION OF ORTHOCARBONIC ACID ESTERS

BACKGROUND

This invention relates to a chemically unique process for the production of orthocarbonic acid esters.

It is known that orthocarbonic acid esters can be obtained via halogen-containing intermediate stages (Houben-Weyl, Vol. VIII Oxygen Compounds III page 110 (1952), Chem. Ber. 94, 544-550 (1961), J. Heterocyclic Chem. 4 (1967) No. 1, pp. 166-167).

In some cases, the yields are moderate, the halogen compounds are difficult to obtain and the hydrohalic acid formed has frequently to be arrested with bases.

SUMMARY

We have now surprisingly found that high yields of orthocarbonic acid esters can be obtained in a smooth process by reacting trichloromethyl isocyanide dichloride with a monofunctional aromatic hydroxy compound or with 2,2,2-trichloroethanol at a temperature in the range of from 0° to 250°C.

DESCRIPTION

The reaction is preferably carried out at a temperature in the range of from 100° to 200°C. It can be conducted both in the presence and in the absence of an inert organic solvent. Any aromatic monofunctional hydroxy compound which does not enter into any secondary reactions with trichloromethyl isocyanide dichloride, can be used for the process according to the invention.

The majority of the monofunctional aromatic hydroxy compounds used for the process according to the invention correspond to the general formula:

$$Ar - OH$$

in which

Ar represents an optionally substituted aromatic radical having up to 24 carbon atoms in the ring system, but preferably having up to 14 and more particularly having either 10 or six carbon atoms. The aromatic radical can also be anellated with a six-membered aromatic hetero-ring system in which oxygen and sulphur represent preferred heteroatoms.

The following are mentioned as examples of substitutents on the aromatic radical: optionally branched aliphatic radicals having up to 18, preferably one to four carbon atoms (aliphatic radicals also including cycloaliphatic radicals having preferably five or six carbon atoms in the ring), O-alkyl- and S-alkyl radicals having preferably one to four carbon atoms, phenyl-, phenoxy-, phenylthio-, halogens (bromine, iodine, preferably fluorine and chlorine), lower (preferably $C_1$ and $C_2$) halogen alkyl radicals (preferably $CCl_3$, $CBr_3$ and $CF_3$), also with different halogen atoms, $NO_2$, $CN$, lower carbalkoxy radicals (preferably $C_{1-4}$), alkyl sulphonyl (preferably $C_{1-4}$) and also the phenylsulphonyl radical.

As already mentioned, particularly preferred compounds include phenols, substituted phenols and also α- and β-naphthols and their substitution products. The following are mentioned as examples of aromatic monohydroxy compounds that can be used in the process according to the invention:

Phenol, 2-, 3-, 4-chlorophenol, 2,4-dichlorophenol, 2,6-dichlorophenol, 2,4,5-trichlorophenol, 2,4,6-trichlorophenol, pentachlorophenol, 2-nitrophenol, 4-chloro-2-nitrophenol, 5-chloro-2-nitrophenol, 4,6-dichloro-2-nitrophenol, 4-, 6-chloro-3-nitrophenol, 4,6-dichloro-3-nitrophenol, 4-nitrophenol, 2,4-dinitrophenol, 2,6-dichloronitrophenol, 4-chloro-2,6-dinitrophenol, 6-chloro-2,4-dinitrophenol, o-cresol, 3-, 4-, 5-, 6-chloro-2-hydroxy-1-methylbenzene, trichlorocresol, 3-, 4-nitro-2-hydroxy-1-methylbenzene, 3,5-dinitro-4-hydroxy-1-methylbenzene, 2,6-diethylphenol, 3-, 4-hydroxy-1,2-dimethylbenzene, 4-, 5-hydroxyl-1,3-dimethylbenzene, 5-hydroxy-1,4-dimethylbenzene, 3-methyl-5-ethylphenol, 2,3,5-trimethylphenol, 2-isopropylphenol, 5-methyl-2-isopropylphenol, 2-methyl-3-isopropylphenol, 2-tert.-butylphenol, 4-tert.-butylphenol, 4-cyclohexylphenol, α-naphthol and β-naphthol.

The aromatic hydroxy compounds used for the process according to the invention are known compounds, as is the 2,2,2-trichloroethanol and the trichloromethyl isocyanide dichloride.

According to one embodiment of the invention the process is carried out by initially introducing the trichloromethyl isocyanide dichloride either in bulk or in solution in a solvent and adding the hydroxy compound dropwise at a temperature of from 0° to 250°C, preferably at a temperature of from 100° to 200°C. Formation of the orthocarbonic acid ester is accompanied by the elimination of hydrogen chloride and cyanogen chloride.

The process according to the invention can be illustrated with reference to the following Examples I and II

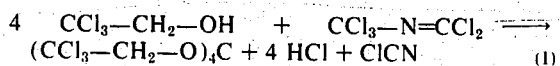

$$4 \; CCl_3-CH_2-OH + CCl_3-N=CCl_2 \longrightarrow$$
$$(CCl_3-CH_2-O)_4C + 4 \; HCl + ClCN \qquad (1)$$

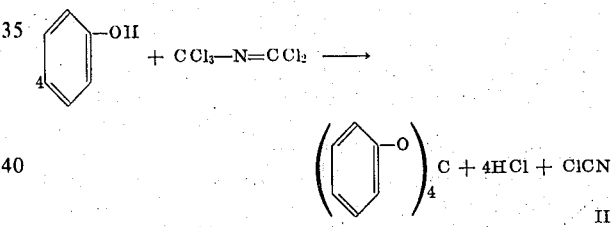

The reaction is preferably carried out in the presence of an inert organic solvent, such as chloroform, carbon tetrachloride, chlorobenzene, dichlorobenzene, trichlorobenzene, nitrobenzene, dioxan, sulpholan, benzene, toluene, xylene or even mixtures of these solvents. It is of course also possible to use trichloromethyl isocyanide dichloride as solvent.

In general, the molar ratio of the reagents is selected so that there is at least one-fourth mol of the trichloromethyl isocyanide dichloride per mol of the hydroxy compound. As already mentioned, it is also possible to use an excess of trichloromethyl isocyanide dichloride. In general, it has proved to be of advantage initially to introduce trichloromethyl isocyanide dichloride and solvent into a reaction vessel and to add the phenol dropwise at about 160°C. After the phenol has been added, the reaction mixture is heated until the evolution of gas has ceased. The reaction products can readily be purified by crystallisation or by distillation.

The fact that the claimed process can be carried out must be regarded as extremely suprising because in all the publications hitherto mentioned trichloromethyl isocyanide dichloride reacts without undergoing any change in its structure.

The following compounds for example can be obtained by the process according to the invention:

Tetra-2,2,2-trichloroethylorthocarbonate, tetra-p-tolylorthocarbonate,
tetra-m-tolylorthocarbonate,
tetra-o-tolylorthocarbonate,
tetra-p-ethylphenylorthocarbonate,
tetra-p-isopropylphenylorthocarbonate,
tetra-p-tert.-butylphenylorthocarbonate,
tetra-p-octylphenylorthocarbonate,
tetra-3,4-dimethylphenylorthocarbonate,
tetra-3-methyl-4-ethylphenylorthocarbonate,
tetra-2-ethyl-5-isopropylphenylorthocarbonate,
tetra-2-ethyl-4,6-dimethylphenylorthocarbonate,
tetra-2,4,5-tributylphenylorthocarbonate,
tetra-α-(5,6,7,8-tetrahydronaphthyl)-orthocarbonate,
tetra-p-cyclohexylphenylorthocarbonate,
tetra-p-cyclopentylphenylorthocarbonate,
tetra-p-(3-methylcyclohexyl)-phenylorthocarbonate,
tetra-p-(2-ethylcyclopentyl)phenylorthocarbonate,
tetra-p-benzylphenylorthocarbonate,
tetra-(2-methyl-4-benzyl)-phenylorthocarbonate,
tetra-p-chlorophenylorthocarbonate,
tetra-o-chlorophenylorthocarbonate,
tetra-p-bromophenylorthocarbonate,
tetra-p-fluorophenylorthocarbonate,
tetra-2-methyl-4-chlorophenylorthocarbonate,
tetra-p-nitrophenylorthocarbonate,
tetra-3-ethyl-4-nitrophenylorthocarbonate,
tetra-m-methoxyphenylorthocarbonate,
tetra-p-ethoxyphenylorthocarbonate,
tetra-p-butoxyphenylorthocarbonate,
tetra-p-phenoxyphenylorthocarbonate,
tetra-p-(4-methylphenoxy)-phenylorthocarbonate,
tetra-β-naphthylorthocarbonate,
tetra-α-(4-methylnaphthyl)-orthocarbonate,
tetra-α-(4-propylnaphthyl)-orthocarbonate,
tetra-β-(4-methylnaphthyl)-orthocarbonate,
tetra-β-(6-ethylnaphthyl)-orthocarbonate,
tetra-β-(7-cyclohexylnaphthyl)-orthocarbonate,
tetra-α-(4-benzylnaphthyl)-orthocarbonate,
tetra-α-(4-chloronaphthyl)-orthocarbonate,
tetra-β-(5-nitronaphthyl)-orthocarbonate,
tetra-α-(4-methoxynaphthyl)-orthocarbonate,
tetra-α-(4-phenoxynaphthyl)-orthocarbonate,
tetra-m-phenylphenylorthocarbonate,
tetra-3-phenyl-4-methylphenylorthocarbonate,
tetra-p-(methylphenyl)phenylorthocarbonate,
tetra-p-(4-cyclohexylphenyl)-phenylorthocarbonate,
tetra-p-(3-chlorophenyl)-phenylorthocarbonate,
tetra-p-(4-nitrophenyl)-phenylorthocarbonate,
tetra-p-(4-methoxyphenyl)-phenylorthocarbonate.

The orthocarbonic acid esters which are obtained as products of the process according to the invention are valuable intermediate products for the production of pestcontrol agents, dyes and plastics.

More particularly, these products can be used for the production of substantially linear fiber- or film-forming polyesters with an extremely low content of free carboxyl groups and a high degree of polymerisation in accordance with DOS No. 2,113,442.

EXAMPLE 1

215.5 g of trichloromethyl isocyanide dichloride are introduced with 200 ml. of O-dichlorobenzene into a three-necked flask and heated to 170°C. A mixture of 376.4 g of phenol in 350 ml. of o-dichlorobenzene is added dropwise from a dropping funnel over a period of 2 hours at that temperature. An evolution of gas begins immediately. On completion of the dropwise addition, the reaction mixture is stirred until the evolution of gas has ceased. The solvent is distilled off at 12 Torr and the residue crystallised by pouring it into cleaning spirit. There is no need for purification, although in special cases the product can be recrystallised either from cleaning spirit or from dilute alcohol.

Yield: 372 g of tetraphenylorthocarbonate = 97 percent of the theoretical yield, m.p. 98°C (from cleaning spirit).

EXAMPLE 2

53.8 g of trichloromethyl isocyanide dichloride and 128.5 g of ortho-chlorophenol are introduced into a flask and slowly heated to 160°C. The evolution of gas begins at as low a temperature as 140°C and ceases after 3 hours.

Yield: 110.5 g of tetra-(o-chlorophenyl)-orthocarbonate = 84 percent of the theoretical yield, m.p. 155°C (cleaning spirit).

| Analysis: | Calc.: | C 57.5 | H 3.06 | O 12.25 | Cl 27.2 |
|---|---|---|---|---|---|
| | Found: | C 57.4 | H 3.20 | O 12.1 | Cl 26.9 |

EXAMPLE 3

26.9 g of trichloromethylisocyanide dichloride, 98.7 g of 2,4,5-trichlorophenol and 100 ml. of nitrobenzene are mixed in a three-necked flask and slowly heated to 160°C, initiating an evolution of gas which ceases after two hours at 180°C. On completion of the reaction, the product is freed from nitrobenzene in vacuo and the residue recrystallised from cleaning spirit. Yield: 72 g of tetra-(2,4,5-trichlorophenyl)-orthocarbonate = 72 percent of the theoretical yield, m.p. 192°C.

| Analysis: | Calc. | C 37.6 | H 1.00 | O 0.83 | Cl 53.3 |
|---|---|---|---|---|---|
| | Found | C 37.9 | H 1.1 | 0.835 | Cl 53.0 |

EXAMPLE 4

26.9 g of trichloromethyl isocyanide dichloride, 81.5 g of 2,4-dichlorophenol and trichlorobenzene are mixed and heated for 3 hours to 180°C in a reaction vessel. Thereafter, the reaction mixture is heated for 30 minutes to 200°C to terminate the evolution of gas. The solvent is removed by distillation, the residue gave a melt with a solidification point of about 60°C. Yield: 64 g of tetra-(2,4-dichlorophenyl)-orthocarbonate = 78 percent of the theoretical yield.

| Analysis: | Calc. | C 45.5 | H 1.82 | O 9.72 | Cl 42.9 |
|---|---|---|---|---|---|
| | Found | C 45.2 | H 2.0 | O 9.85 | Cl 42.7 |

EXAMPLE 5

As in the preceding Examples, 53.75 g of trichloromethyl isocyanide dichloride, 200 ml. of o-dichlorobenzene and 139.1 g of p-nitrophenol are heated to 150°C. The evolution of gas is over after 2 hours. The solution is cooled to 5°C and the precipitated reaction product is filtered off under suction. Yield: 117 g of tetra-(p-nitrophenyl)-orthocarbonate = 83 percent of the theoretical yield, m.p. 227°C (chlorobenzene).

| Analysis: | Calc. | C 53.25 | H 2.83 | O 9.92 | N 34.05 |
|---|---|---|---|---|---|
| | Found | C 53.0 | H 2.1 | O 10.0 | N 33.9 |

EXAMPLE 6

21.5 g of (0.1 mol) of trichloromethyl isocyanide dichloride are heated with 50 ml. of xylene to 140°C in a three-necked flask. 66.4 g (0.4 mol) of 4-hydroxybenzoic acid ethylester mixed with 200 ml. of xylene are then added dropwise over a period of one hour at the aforementioned temperature. After 3 hours, the solvent is removed by distillation and the residue purified by crystallisation. Yield: 51 g of tetra-(p-benzoic acid ethyl ester)-ortho carbonate = 76 percent of the theoretical yield, m.p. 112°C.

| Analysis: | Calc. | C 66.1 | H 5.36 | O 28.6 |
|---|---|---|---|---|
| | Found | C 66.1 | H 5.6 | O 28.4 |

EXAMPLE 7

53.75 g (0.25 mol) of trichloromethyl isocyanide dichloride in 100 ml. of o-dichlorobenzene are heated to 160°C in a three-necked flask equipped with a stirring mechanism, a reflux condenser and a dropping funnel. A solution of 150 g (1 mol) of 2-tert.-butyl phenol in 150 ml. of o-dichlorobenzene is added dropwise over a period of 2 hours. The evolution of gas ceases after another 2 hours. The solvent is distilled off in a water-jet vacuum and the residue is recrystallised from cleaning spirit (boiling range 90° to 110°C). Tetra-(o-tert.-butylphenyl)-orthocarbonate is obtained in a yield of 118 g of 78 percent of the theoretical yield, m.p. 259°–260°C (recrystallised from cleaning spirit).

| Analysis: | Calc. | C 80.75 | H 8.55 | O 10.05 |
|---|---|---|---|---|
| | Found | C 81.0 | H 8.7 | O 10.4 |

EXAMPLE 8

43 g of trichloromethylisocyanide dichloride (0.2 mol) are heated to 170°C in 50 ml. of o-dichlorobenzene, and a warm solution of 122.5 g of 5-nitro-o-cresol (0.8 mol) in 250 ml. of o-dichlorobenzene is added at that temperature. The reaction mixture is then stirred for three hours until the evolution of gas ceases. After cooling, the solvent is removed and the residue recrystallised from xylene. Yield 109 g of tetra-(2-methyl-5-nitrophenyl)-orthocarbonate = 88 percent of the theoretical yield, m.p. 262°–263°C.

| Analysis: | Calc. | C 56.2 | H 3.87 | N 9.05 | O 31.0 |
|---|---|---|---|---|---|
| | Found | C 56.2 | H 4.1 | N 8.8 | O 30.7 |

EXAMPLE 9

21.5 g (0.1 mol) of trichloromethyl isocyanide dichloride and 48.8 g (0.4 mol) of 5-hydroxy-1,4-dimethyl benzene are heated with stirring to 160°C. The evolution of gas ceases after two hours. The cooled residue is recrystallised from ethanol. yield 45.6 g of tetra-(2,5-dimethylphenyl)-orthocarbonate = 92 percent of the theoretical yield, m.p. 130°C.

| Analysis: | Calc. | C 79.2 | H 7.2 | O 13.0 |
|---|---|---|---|---|
| | Found | C 79.5 | H 7.5 | O 13.0 |

EXAMPLE 10

53.75 g of trichloromethylisocyanide dichloride (0.25 mol) are heated to 170°C in 50 ml. of o-dichlorobenzene, and 149.4 g of 2,2,2-trichloroethanol (1 mol) are added dropwise addition over a period of 1 hour. The mixture is then stirred for 8 hours at the aforementioned temperature. After cooling, the residue is recrystallised from xylene. Yield: 119 g of tetra-(2,2,2-trichloroethyl)-orthocarbonate = 78 percent of the theoretical yield, m.p. 131°C.

| Analysis: | Calc. | C 17.85 | H 1.32 | O 10.58 | Cl 70.25 |
|---|---|---|---|---|---|
| | Found | C 18.2 | H 1.4 | O 10.3 | Cl 70.0 |

What is claimed is:

1. Process for preparing orthocarbonic acid esters which comprises reacting trichloromethyl isocyanide dichloride with a monofunctional aromatic hydroxy compound having the formula:

Ar — OH wherein Ar is selected from the group consisting of phenyl, naphthyl and the foregoing substituted with a substituent selected from the group consisting of alkoxy, phenyl, phenoxy, phenylthio, halogen, lower haloalkyl, nitro, —CN, lower carbalkoxy, alkylsulphonyl, phenylsulphonyl, methyl, ethyl, isopropyl, butyl, tert-.butyl, octyl, cyclohexyl, cyclopentyl, methylcyclohexyl and ethylcyclopentyl at a temperature in the range of from 0°C to 250°C.

2. Process of claim 1 carried out at a temperature of from 100°C to 200°C.

3. Process of claim 1 wherein the reaction is carried out in the presence of an inert organic solvent.

4. Process of claim 1 wherein the aromatic hydroxy compound is phenol.

5. Process of claim 1 wherein at least one-fourth mol of the trichloromethyl isocyanide dichloride is used per mol of hydroxy compound.

6. Process for preparing an orthocarbonic acid ester which comprises reacting trichloromethyl isocyanide dichloride with 2,2,2-trichloroethanol at a temperature in the range of from 0°C to 250°C.

* * * * *

UNITED STATES PATENT OFFICE
CERTIFICATE OF CORRECTION

Patent No. 3,857,897　　　　　　　　Dated December 31, 1975

Inventor(s) Kurt Findeisen and Kuno Wagner

It is certified that error appears in the above-identified patent and that said Letters Patent are hereby corrected as shown below:

Column 4, line 41, in the Analysis "0.83" should read --0.803--.

Signed and sealed this 15th day of April 1975.

(SEAL)
Attest:

RUTH C. MASON
Attesting Officer

C. MARSHALL DANN
Commissioner of Patents
and Trademarks